United States Patent [19]
Lin

[11] Patent Number: 6,022,165
[45] Date of Patent: Feb. 8, 2000

[54] RIGID INTERNAL CONNECTOR

[75] Inventor: Jin-Jie Lin, Livermore, Calif.

[73] Assignee: Simpson Strong-Tie Company, Inc., Pleasanton, Calif.

[21] Appl. No.: 08/961,543

[22] Filed: Oct. 30, 1997

[51] Int. Cl.[7] .................................................. B25G 3/00
[52] U.S. Cl. .................... 403/231; 403/170; 403/217; 403/205; 52/656.9; 52/655.1; 52/712
[58] Field of Search .................................... 403/231, 170, 403/217, 403, 171, 176, 205, 230; 52/280, 656.9, 655.1, 712, 81.3; 248/220.1, 300

[56] References Cited

U.S. PATENT DOCUMENTS

| | | |
|---|---|---|
| 115,195 | 5/1871 | Grove . |
| 952,506 | 3/1910 | Bumpus . |
| 2,037,736 | 4/1936 | Payne et al. . |
| 2,874,708 | 2/1959 | Daus, Jr. . |
| 3,315,639 | 4/1967 | Close ................................... 403/231 X |
| 3,333,875 | 8/1967 | Tracy . |
| 3,353,854 | 11/1967 | Hansen ............................... 52/656.9 X |
| 3,399,914 | 9/1968 | Grant ................................... 403/171 X |
| 3,466,071 | 9/1969 | Reed . |
| 3,572,787 | 3/1971 | Timmerman . |
| 3,716,259 | 2/1973 | Weill et al. .......................... 403/217 X |
| 3,767,237 | 10/1973 | Suchowski .............................. 403/171 |
| 3,972,169 | 8/1976 | Sheppard, Jr. . |
| 4,072,433 | 2/1978 | Veyhl . |
| 4,076,431 | 2/1978 | Burvall . |
| 4,078,847 | 3/1978 | Presnick ............................. 403/171 X |
| 4,297,048 | 10/1981 | Jureit . |
| 4,318,628 | 3/1982 | Mancini . |
| 4,413,570 | 11/1983 | Haigh ................................. 52/656.9 X |
| 4,688,358 | 8/1987 | Madray . |
| 4,726,701 | 2/1988 | Thomas ............................... 403/176 X |
| 4,758,111 | 7/1988 | Vitta . |
| 4,854,531 | 8/1989 | Esposito . |
| 4,883,246 | 11/1989 | Esposito . |
| 4,885,883 | 12/1989 | Wright . |
| 4,910,939 | 3/1990 | Cavanagh . |
| 4,998,697 | 3/1991 | Esposito . |
| 5,150,982 | 9/1992 | Gilb ..................................... 52/712 X |
| 5,170,977 | 12/1992 | McMillan . |
| 5,253,465 | 10/1993 | Gilb . |
| 5,259,685 | 11/1993 | Gilb . |
| 5,328,287 | 7/1994 | Gilb . |
| 5,372,448 | 12/1994 | Gilb . |
| 5,380,115 | 1/1995 | Colonias . |
| 5,399,044 | 3/1995 | Gilb . |
| 5,516,225 | 5/1996 | Kvols .................................. 403/231 X |
| 5,528,875 | 6/1996 | Ziegler, Jr. . |
| 5,647,182 | 7/1997 | Rutherford ............................ 52/712 X |

FOREIGN PATENT DOCUMENTS

| | | |
|---|---|---|
| 1286872 | 1/1962 | France . |
| 1295797 | 5/1962 | France . |
| 744294 | 2/1956 | United Kingdom . |
| 742617 | 12/1995 | United Kingdom . |

*Primary Examiner*—Terry Lee Melius
*Assistant Examiner*—William L. Miller
*Attorney, Agent, or Firm*—James R. Cypher

[57] ABSTRACT

A rigid intersection connection, wherein an elongated longitudinal member, a first elongated lateral member, and a second elongated lateral member are joined by a one-piece rigid tie. The one-piece rigid tie joins the first and second elongated lateral members to the elongated longitudinal member with first, second, third, fourth, fifth and sixth fasteners. The one-piece rigid tie has a central web member to which three gussets attach. Each gusset in turn connects to two attachment tabs. The attachment tabs are disposed against the elongated members and are connected thereto by fasteners.

14 Claims, 10 Drawing Sheets

RIGID INTERNAL CONNECTOR

BACKGROUND OF THE INVENTION

This invention relates to a connection between three elongated structural members, two of the members being laterally disposed away from the third member. The present invention is particularly suited for forming a corner connection of three orthogonally disposed structural members. The present invention uses what is known as a tie or connector for making the connection between the elongated stuctural members.

Various types and configurations of connectors for joining elongated structural members to each other have been taught. In building construction, where finishing materials will be applied to hide the structural frame, connectors are generally designed for strength and not for aesthetic considerations. Strength and rigidity are generally provided by forming heavy gauge connectors that present large bearing surfaces for the supported structural member and provide lateral bracing to the connected structural members. These connectors often embrace or wrap around three or more sides of the structural materials they connect. The inventor calls these external connectors. Materials for external connectors in construction applications are generally selected for their strength and not their appearance. Generally, external connectors cannot handle members of variable sizes since they are designed to embrace the structural members they connect.

In the furniture arts, where aesthetic considerations are important, designers have adopted a number of approaches to creating connections that are both rigid and aesthetically appealing. Connectors are often hidden underneath or behind the structural materials they connect, so that they are away from view. The inventor calls these internal connectors. Internal connectors are often small, making them less noticeable. Connections made with internal connectors are generally not as rigid as those made with external connectors.

The present invention provides a connection between three structural members that uses a partially hidden, internal connector that has load-bearing qualities and rigidity more akin to a connection made with an external connector.

SUMMARY OF THE INVENTION

An object of the current invention is to provide a connection having a connector or tie that joins two members to a third member, the two members being laterally disposed in relation to the third member.

Another object of the current invention is to provide a connection having a tie that interfaces with the hidden or internal faces of the structural members it joins such that the tie is generally hidden from view.

Another object of the present invention is to provide a connection that uses a tie which can be used with structural members of varying sizes.

Another object of the present invention is to provide a corner connection for three structural members that uses a tie and leaves the external or exposed surfaces of the structural members available for the attachment of further members.

Another object of the present invention is to provide a tie for making the connection of the present invention that is economical to produce on automated die press machinery.

Another object of the present invention is to provide a connection that is easily constructed.

Another object of the present invention is to provide a rigid connection that can join three orthogonally disposed members.

Another object of the present invention is to provide a rigid connection that allows one of the three members joined to continue past the joint with the other two members.

Another object of the present invention is to provide a tie for making the connection of the present invention that, when installed, will provide the same load bearing qualities no matter how it is oriented with respect to the structural members it connects.

DESCRIPTION OF THE PREFERRED EMBODIMENT

Figure 1:
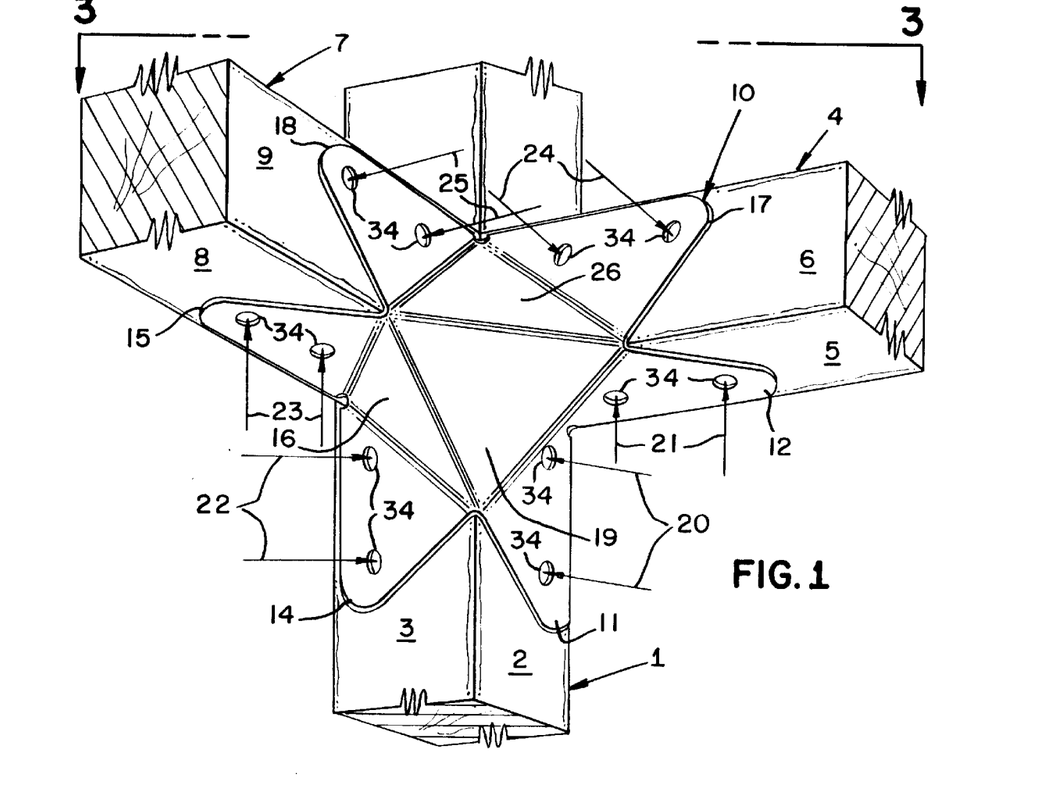
FIG. 1 is a perspective view of the preferred embodiment of a rigid connection formed according to the present invention. Arrows represent fasteners.

As is best seen in FIG. 1, the preferred form of a rigid intersection connection constructed according to the present invention has an elongated longitudinal member 1, a first elongated lateral member 4, a second elongated lateral member 7, and a one-piece rigid tie 10 configured for rigidly tying the first and second elongated lateral members 4 and 7 to the elongated longitudinal member 1 with first, second, third, fourth, fifth and sixth fastener means 20, 21, 22, 23, 24, and 25.

In the preferred embodiment, the elongated longitudinal member 1 has a first side 2, a second side 3 and is made of wood. The first elongated lateral member 4 has a first base side 5, a first flank side 6, a first end 27 and is also made of wood. The first elongated lateral member 4 intersects with the elongated longitudinal member 1, forming a first joint 28 at the interface of the first end 27 of the first elongated lateral member 4 and a portion of the first side 2 of the elongated longitudinal member 1. The second elongated lateral member 7 has a second base side 8, a second flank side 9, a second end 29, and is also made of wood. The second elongated lateral member 7 intersects with the elongated longitudinal member 1 at an elevation on the elongated longitudinal member 1 near the first joint 28. The second end 29 of the second elongated lateral member 7 forms a second joint 30 with a portion of the second side 3 of the elongated longitudinal member 1.

In the present invention, first and second joints 28 and 30 need not be tight. For example, in first joint 28, the first end 27 of the first elongated lateral member 4 need not be in perfect continuous contact with the first side 2 of the elongated longitudinal member 1 for a rigid connection to be created. This feature enables the hobbyist who does not have the proper tools for creating a tight joint to create a rigid connection. It is preferred, though, that first and second joints 28 and 30 are as tight as possible.

The one-piece rigid tie 10 has a first side attachment tab 11 disposed in registration with a portion of the first side 2 of the elongated longitudinal member 1 and a first base side attachment tab 12 disposed in registration with a portion of the first base side 5 of the first elongated lateral member 4. A first gusset 13 is formed integral with and between the first side attachment tab 11 and the first base side attachment tab 12. In the preferred embodiment, screws are used as the first fastener means 20 for attaching the first side attachment tab 11 to the first side 2 of the elongated longitudinal member 1. In the preferred embodiment, screws are also used as the second fastener means 21 for attaching the first base side attachment tab 12 to the first base side 5 of the first elongated lateral member 4.

The one-piece rigid tie 10 has a second side attachment tab 14 disposed in registration with a portion of the second side 3 of the elongated longitudinal member 1, and a second base side attachment tab 15 disposed in registration with a portion of the second base side 8 of the second elongated lateral member 7. A second gusset 16 is formed integral with and between the second side attachment tab 14 and the second base side attachment tab 15. In the preferred embodiment, screws are used as the third fastener means 22 for attaching the second side attachment tab 14 to the second side 3 of the elongated longitudinal member 1. In the preferred embodiment, screws are also used as the fourth fastener means 23 for attaching the second base side attachment tab 15 to the second base side 8 of the second elongated lateral member 7.

The one-piece rigid tie 10 has a first flank side attachment tab 17 disposed in registration with a portion of the first flank side 6 of the first elongated lateral member 4. A second flank side attachment tab 18 is disposed in registration with a portion of the second flank side 9 of the second elongated later member 7. A third gusset 26 is formed integral with and between the first flank side attachment tab 17 and the second flank side attachment tab 18. In the preferred embodiment, screws are used as the fifth fastener means 24 for attaching the first flank side attachment tab 17 to the first flank side 6 of the first elongated lateral member 4. In the preferred embodiment, screws are also used as the sixth fastener means 25 for attaching the second flank side attachment tab 18 to the second flank side 9 of the second elongated lateral member 7.

In the preferred embodiment, a triangular web member 19 is formed integral with and connecting the first gusset 13, the second gusset 16, and the third gusset 26.

The first, second, third, fourth, fifth and sixth fastener means 20, 21, 22, 23, 24 and 25 for connecting the first and second elongated lateral members 4 and 7 by means of the one-piece rigid tie 10 to the elongated longitudinal member 1 can be nails, screws, bolts, adhesives or welds.

In the preferred embodiment, the elongated longitudinal member 1 and the first and second elongated lateral members 4 and 7 are made from wood. Further, the first, second, third, fourth, fifth and sixth fastener means 20, 21, 22, 23, 24 and 25 are wood screws formed with self-drilling points and relatively flats heads that can receive a Phillips head screw driver. The relatively flat heads present a low profile above the attachment tabs 11, 12, 14, 15, 17 and 18 of the one-piece rigid tie 10 that is more aesthetically pleasing.

The preferred embodiment is formed with openings 34 in the attachment tabs 11, 12, 14, 15, 17 and 18 for receiving the first, second, third, fourth, fifth and sixth fastener means 20, 21, 22, 23, 24 and 25 in close registration.

As shown in FIG. 1, in the preferred embodiment of the present invention, the first gusset 13, second gusset 16, and third gusset 26 are triangular in shape. Having first, second and third gussets 13, 16 and 26 that are triangular in shape provides a pleasing appearance while maintaining high rigidity.

The preferred embodiment of the one-piece rigid tie 10 is made from 20 Gauge galvanized sheet steel having a yield strength of 28 KSI and an ultimate strength of 38 KSI. Since no welding is required to form the one-piece rigid tie 10, it need not be painted after being formed, which reduces production costs.

Figure 7:
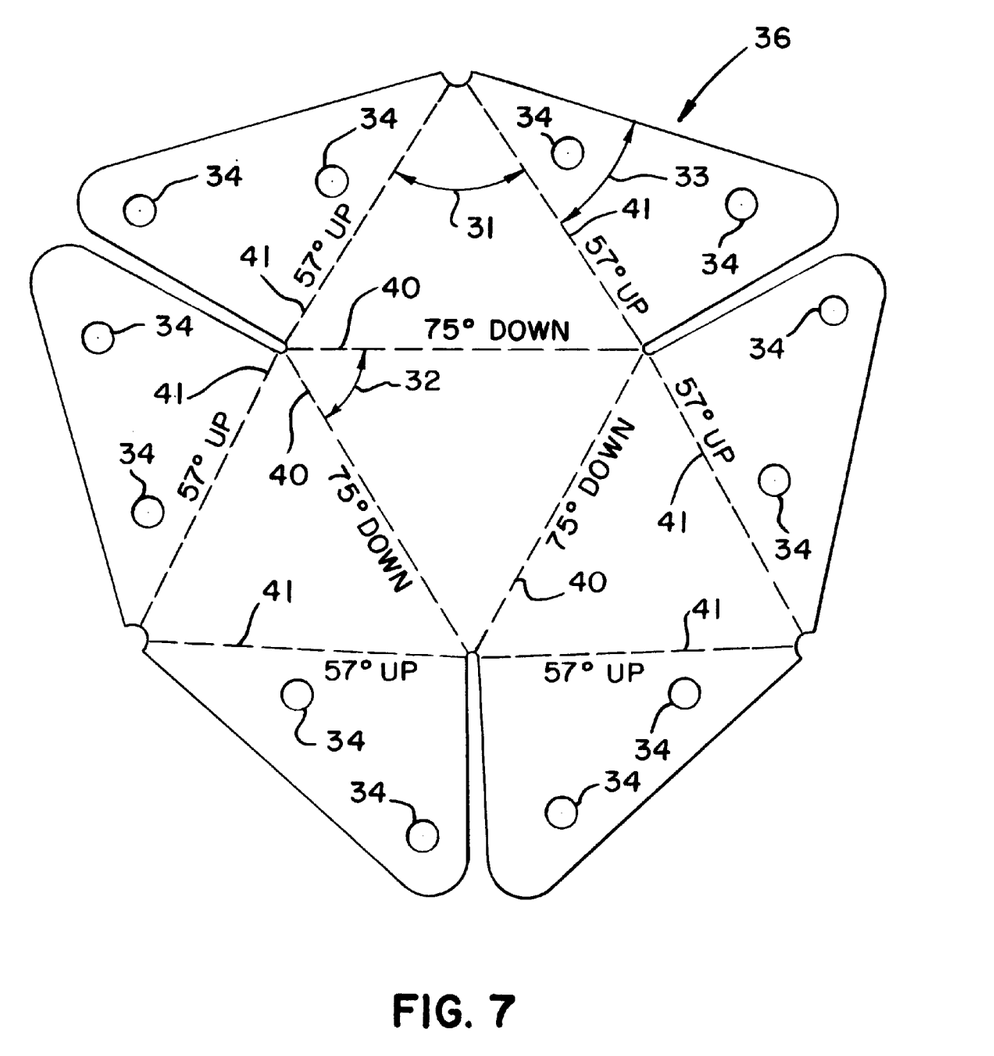
FIG. 7 is plan view of a blank of cut sheet metal from which the preferred tie for making the connection of the present invention can be formed.

The preferred embodiment of the one-piece rigid tie connector 10 is formed by cutting a blank 36 in the configuration shown in FIG. 7 from galvanized sheet steel. With reference to FIG. 7, the triangular web member 19 is an equilateral triangle, thus angle 32 is 60°. The first, second and third gussets 13, 16 and 26 are isosceles triangles. As shown in FIG. 7, the unique angle 31 of the isosceles triangle measures 65° 10' 37". The attachment tabs 11, 12, 14, 15, 17 and 18 are all similar in shape. Angle 33 is preferably 40° 23' 9". Angles 31, 32 and 33 have been optimized for a one-piece rigid tie 10 that fits nominal 2"×2" elongated structural members 1, 4 and 7. Openings 34 in the attachment tabs 11, 12, 14, 15, 17 and 18 are staggered to allow for spacing between screws 20 and 22 in elongated longitudinal member 1, between screws 21 and 24 in first elongated lateral member 4, and between screws 23 and 25 in the second elongated lateral member 7.

As is shown in FIG. 7, in the preferred embodiment, the one-piece rigid tie connector 10 is formed by bending the blank 36 at selected bend lines 40 and 41. First, the web member 19 is created by bending the outer portions of the blank 36 down 75° at bend lines 40. Then, the gussets 13, 16 and 26 are differentiated from the attachment tabs 11, 12, 14, 15, 17 and 18 by bending the portions that will become the attachment tabs 11, 12, 14, 15, 17 and 18 up 57° at bend lines 41. The one-piece rigid tie 10 is preferably formed on automated progressive die machinery.

A connection formed according to the present invention in the preferred manner is accomplished as follows. A wooden structural member is selected as the elongated longitudinal member 1. A one-piece rigid tie 10 formed from a sheet metal blank 36 is set against the elongated longitudinal member 1 with the first and second side attachment tabs 11 and 14 in registration with the first and second sides 2 and 3 of the elongated longitudinal member 1. The one-piece rigid tie 10 is positioned so that the first and second base side attachment tabs 12 and 15 are in the proper positions for receiving the first and second base sides 5 and 8 of the first and second elongated lateral members 4 and 7. Wood screws 20 are then driven through the first attachment tab 11 and into the elongated longitudinal member 1. Wood screws 22 are then driven through the second attachment tab 14 into the elongated longitudinal member 1. The first elongated lateral member 4 is then placed between the first flank side and first base side attachment tabs 17 and 12 of the one-piece rigid tie connector 10 in the desired position. Wood screws 24 and 21 are then driven through the first flank side and first base side attachment tabs 17 and 12 into the first elongated lateral member 4. Then, the second elongated lateral member 7 is placed between the second flank side and second base side attachment tabs 18 and 15 of the one-piece rigid tie 10 in the desired position. Wood screws 25 and 23 are driven through the second flank side and second base side attachment tabs 18 and 15 into the second elongated lateral member 7, completing the connection.

Figure 2:
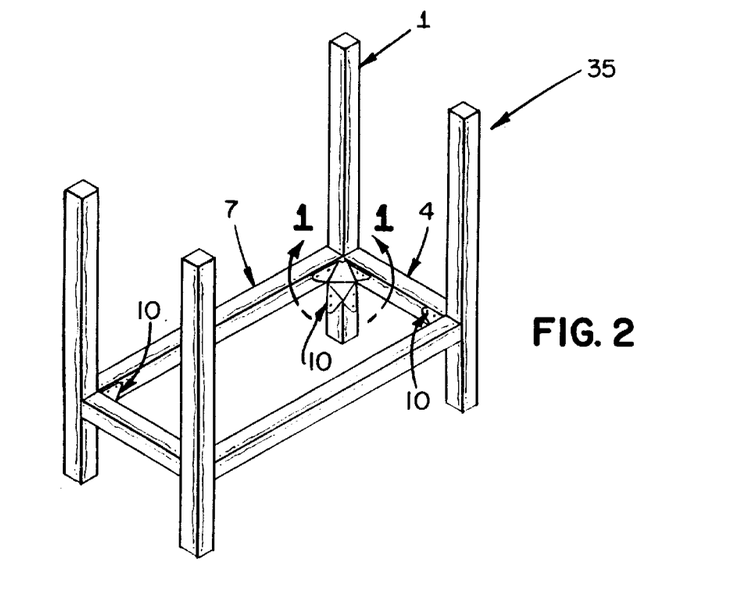
FIG. 2 is a perspective view of a stand made with connections according to the present invention.
Figure 3:
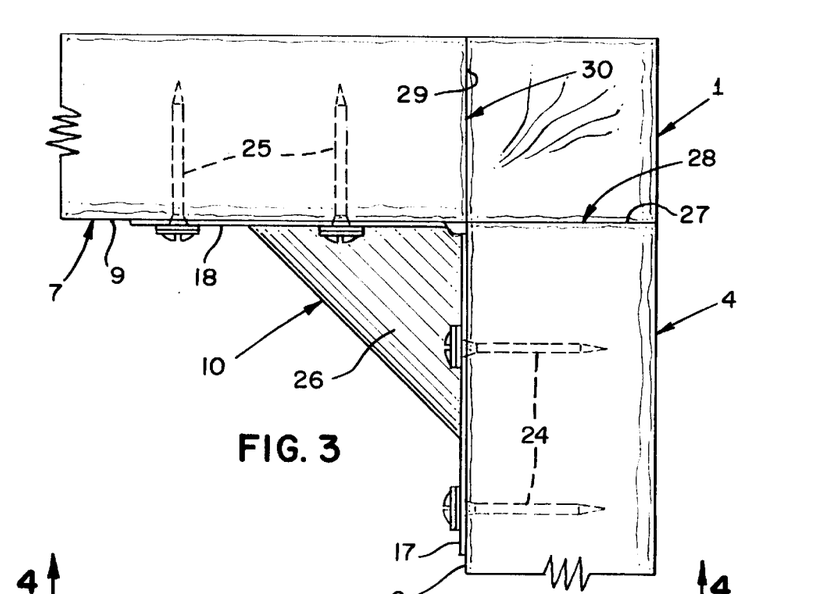
FIG. 3 is a top view of the present invention taken along line 3—3 of FIG. 1.
Figure 4:
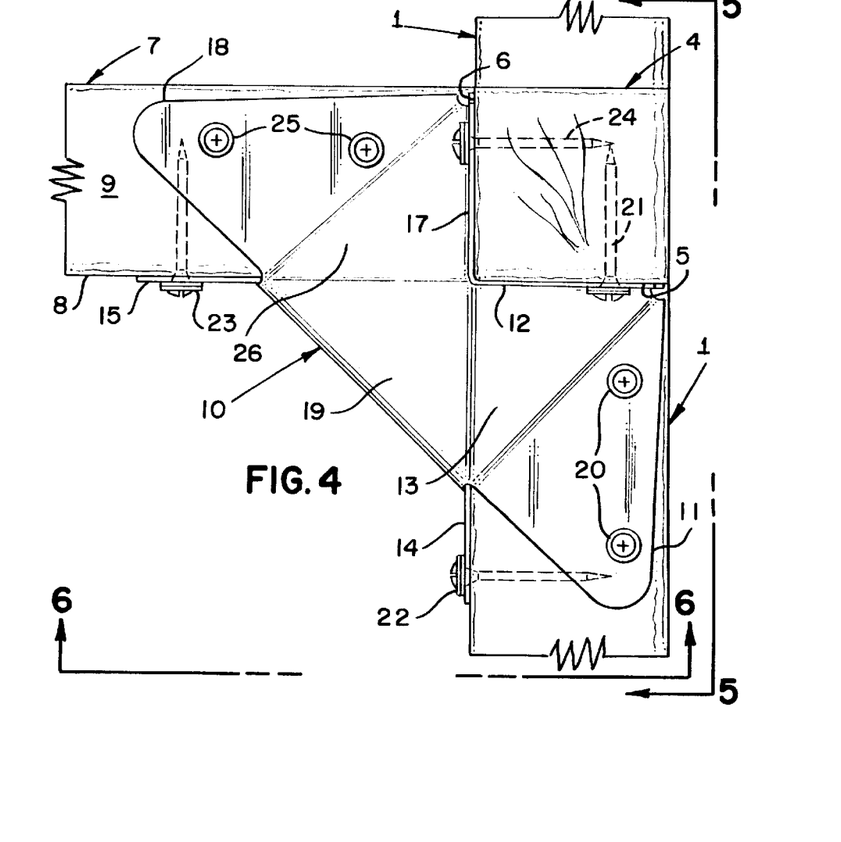
FIG. 4 is a side view of the present invention taken along line 4—4 of FIG. 3.
Figure 5:
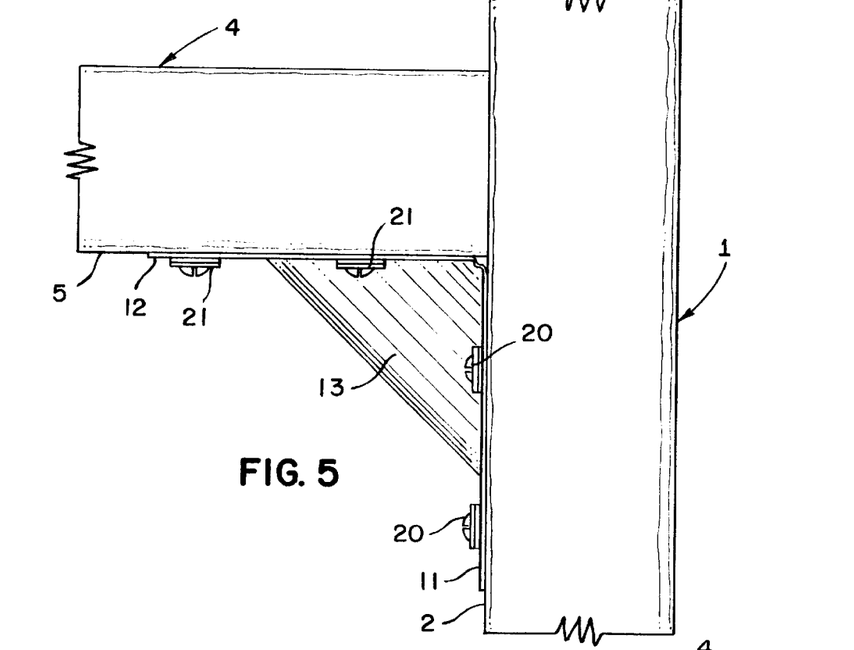
FIG. 5 is a side view of the present invention taken line 5—5 of FIG. 4.
Figure 6:
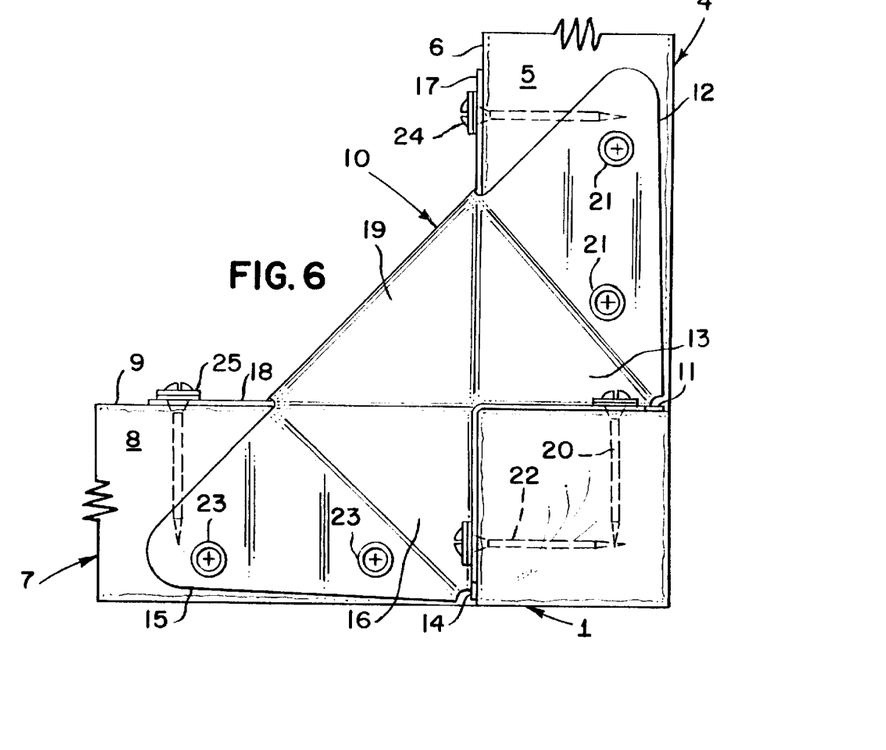
FIG. 6 is a bottom view of the present invention taken along line 6—6 of FIG. 4.

As is shown in FIG. 2, in a stand 35 made with connections formed according to the present invention, the one-piece, rigid ties 10 are fairly well hidden. Furthermore, facing materials such as plywood sheathing can easily be attached to the stand 35 at the connections, since the one-piece rigid ties do not extend to the exposed or outer faces of the elongated structural members.

Figure 8:
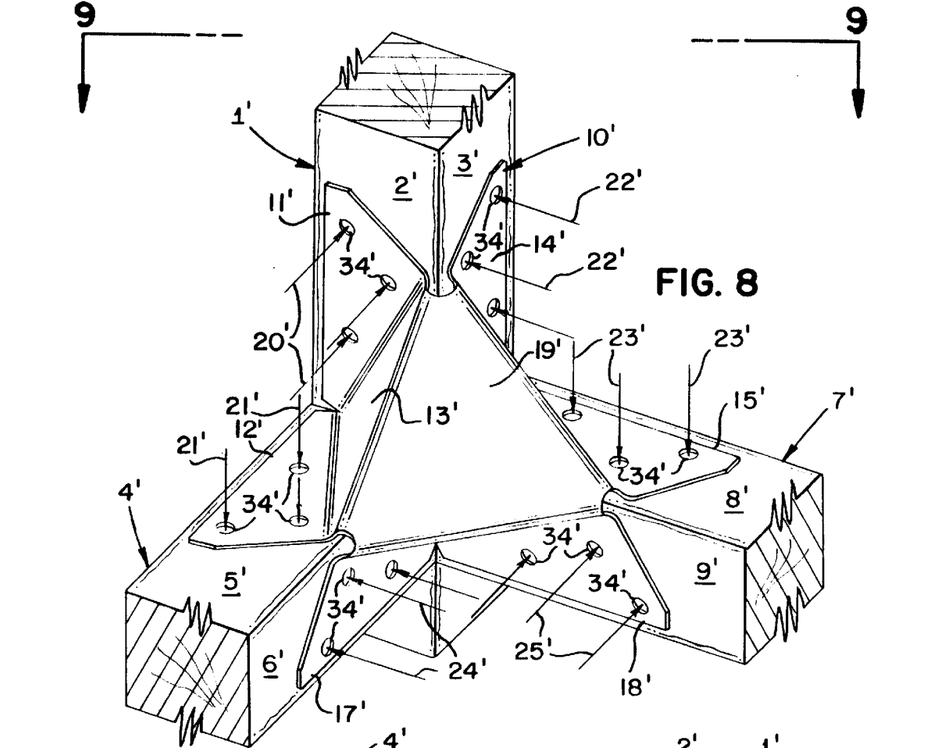
FIG. 8 is a perspective view of an alternate connection formed according to the present invention.
Figure 9:
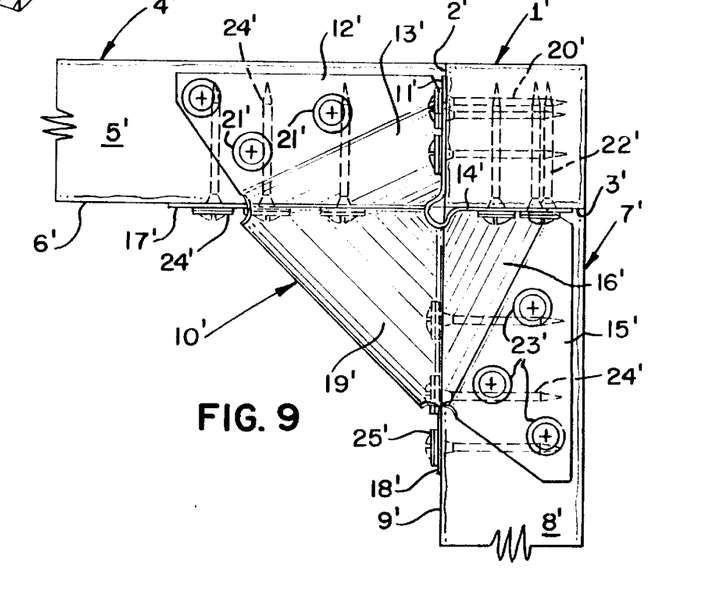
FIG. 9 is top view taken along line 9—9 of FIG. 8.
Figure 10:
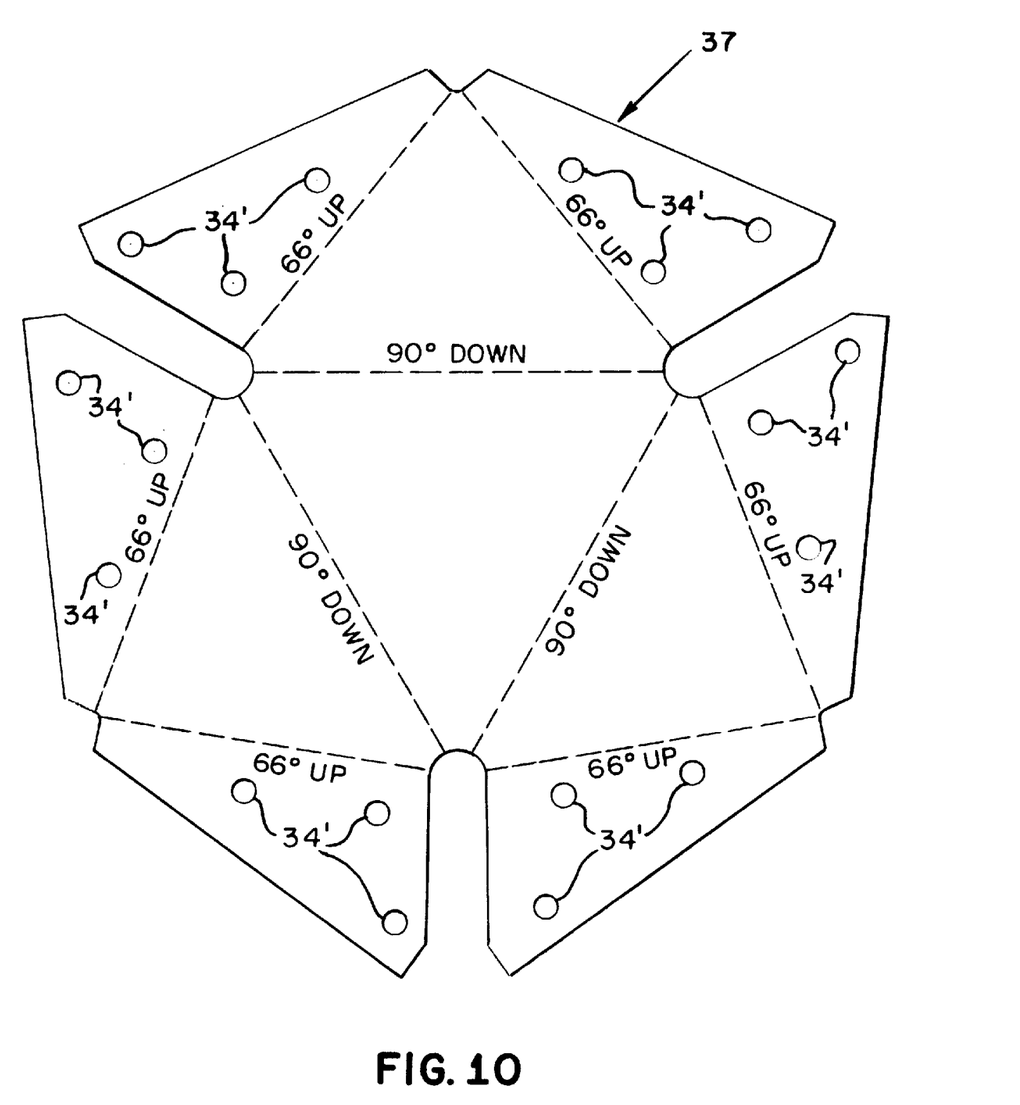
FIG. 10 is plan view of the blank of an alternate connector for forming a connection according to the present invention.

FIGS. 8 and 9 show an alternate embodiment of the connection made according to the present invention using a one-piece rigid tie 10' having triangular first, second and third gussets 13', 16' and 26' like the preferred embodiment. However, the blank 37 for this alternate embodiment is shaped somewhat differently to accommodate bending at different bend angles shown in FIG. 10 to form a one-piece rigid tie connection 10'. Alternate embodiment 10' is formed with the same elements and works in a similar fashion; thus further description is not necessary. It has all the same elements as the preferred embodiment. Like elements are designated by like numbers followed by single primes.

Figure 11:
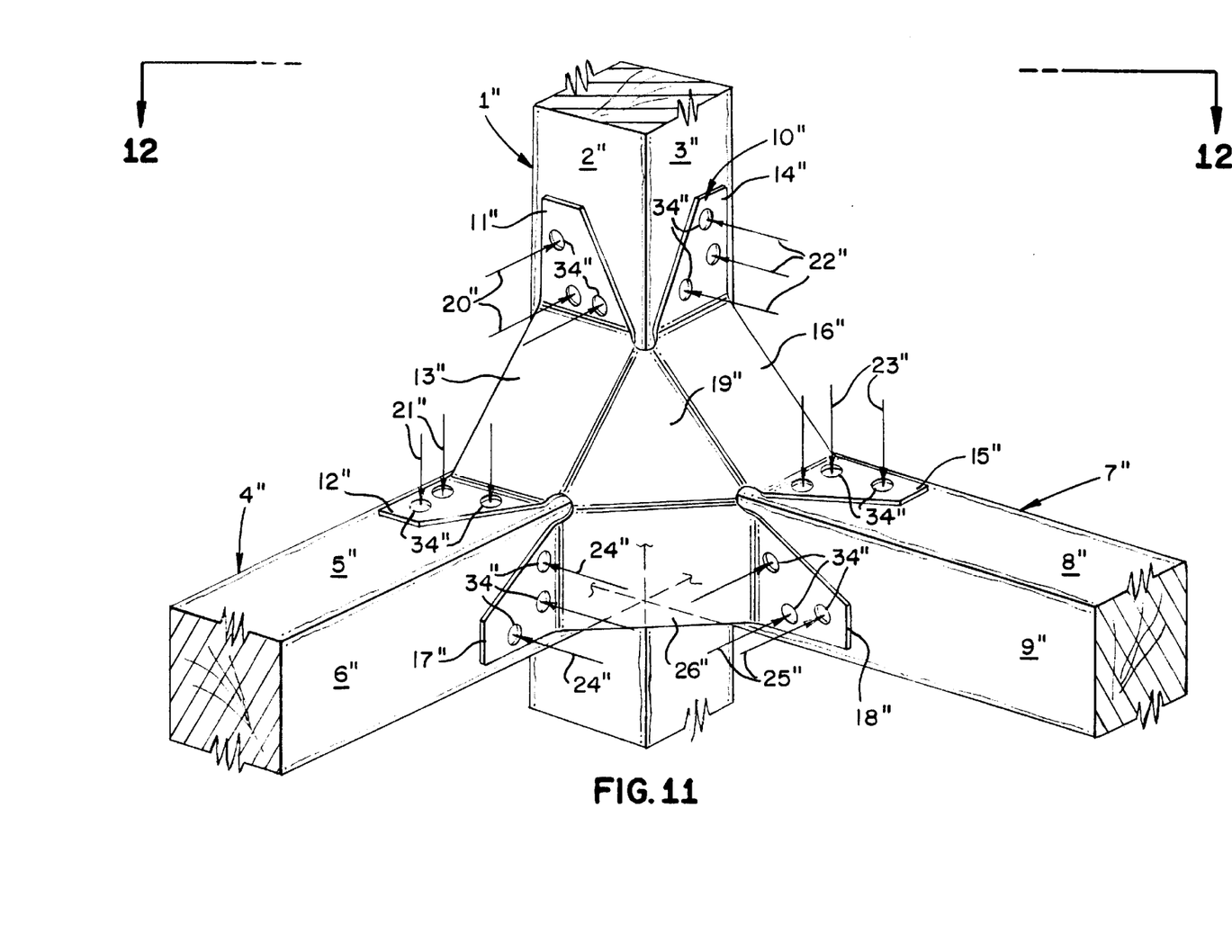
FIG. 11 is a perspective view of an alternate connection formed according to the present invention.
Figure 12:
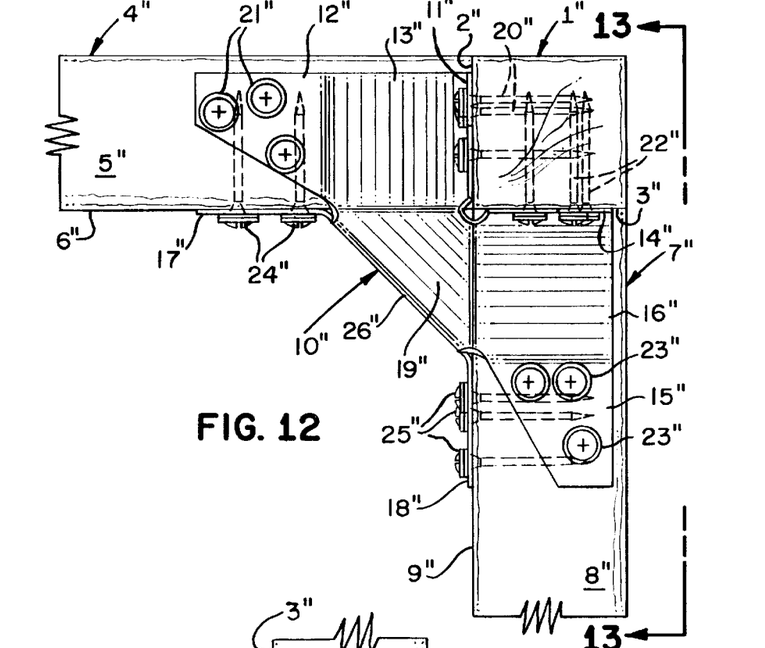
FIG. 12 is a top view taken along line 12—12 of FIG. 11.
Figure 13:
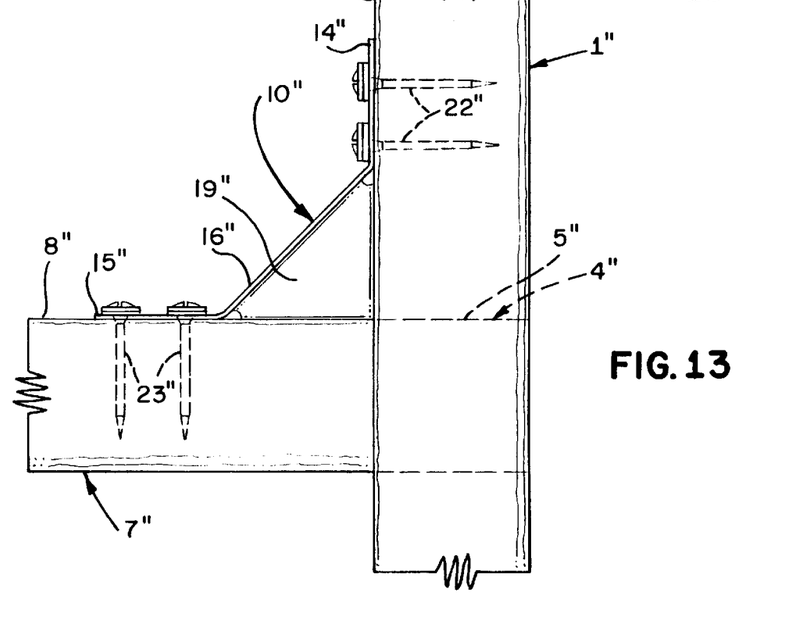
FIG. 13 is a side view taken along line 13—13 of FIG. 12.
Figure 16:
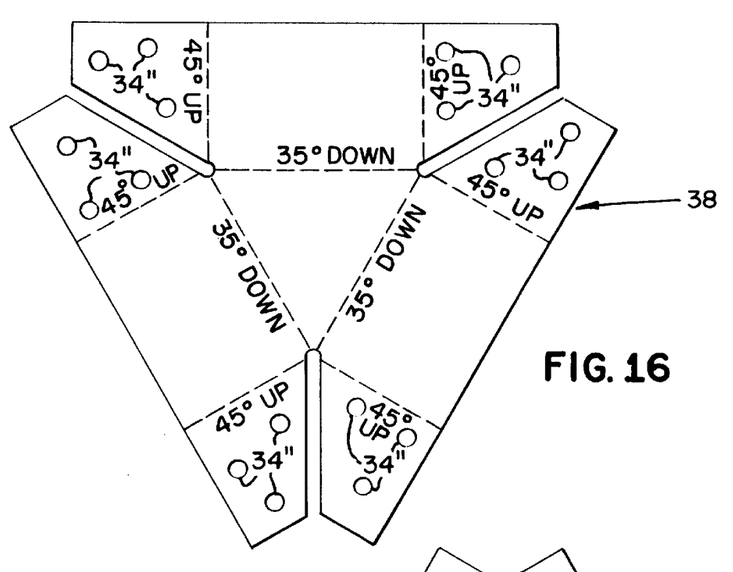
FIG. 16 is a plan view of a blank that can be bent to form the tie of FIG. 11.

FIGS. 11, 12 and 13 show an alternate embodiment of the connection made according to the present invention using a one-piece rigid tie 10" having first, second and third gussets 13", 16" and 26" that are rectangular. The blank 38 for this alternate embodiment is shaped differently from the preferred embodiment to accommodate the rectangular fist, second and third gussets 13', 16' and 26'. See FIG. 16. The blank 38 is bent at the dotted bend lines and at the specified angles shown in FIG. 16 to form a one-piece rigid tie connection 10". Alternate embodiment 10" is formed with the same elements and works in a similar fashion as the preferred embodiment; thus further description is not necessary. It has all the same elements as the preferred embodiment. Like elements are identified with like numbers followed by a double prime.

Figures 14, 15:
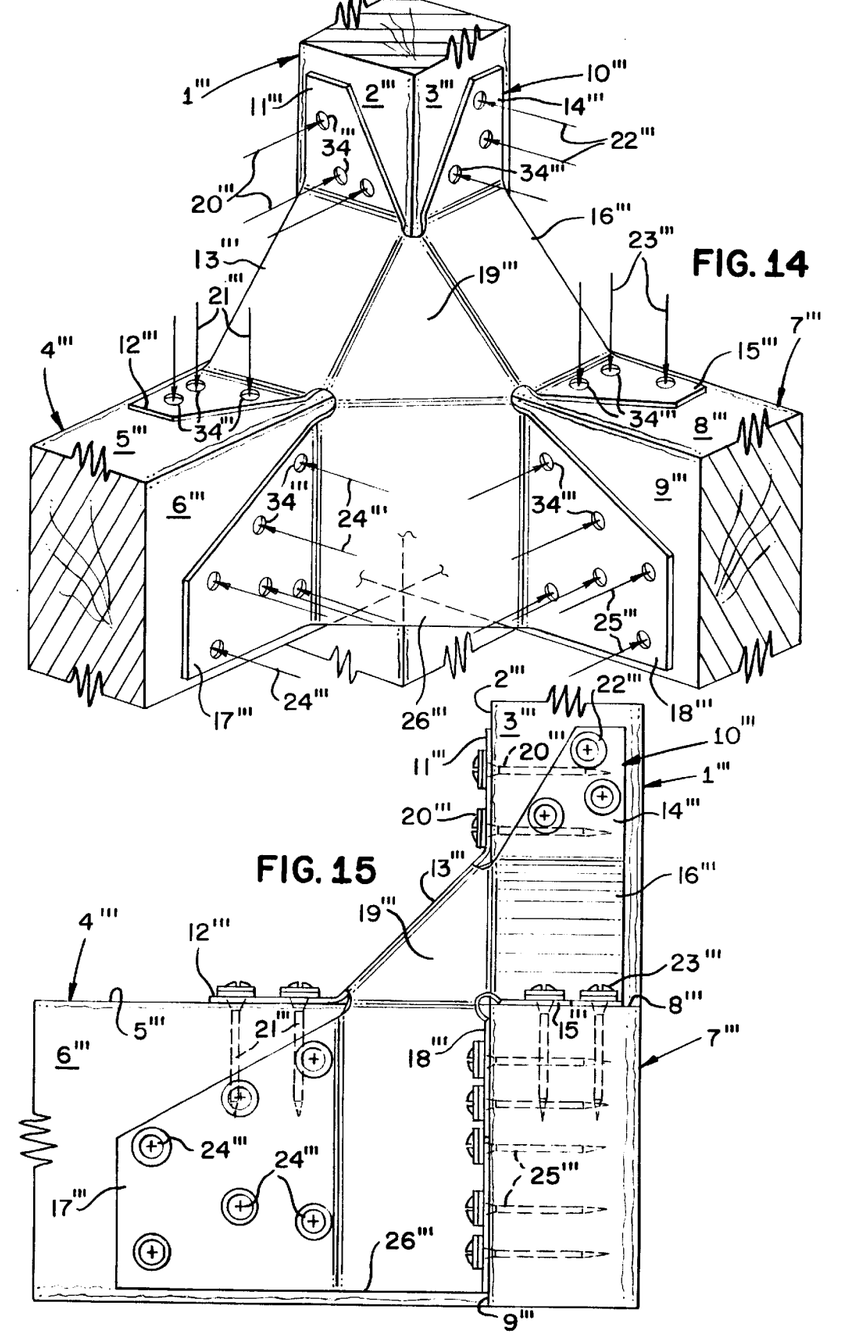
FIG. 14 is a perspective view of an alternate connection formed according to the present invention.
FIG. 15 is a side view of the connection of FIG. 14.
Figure 17:
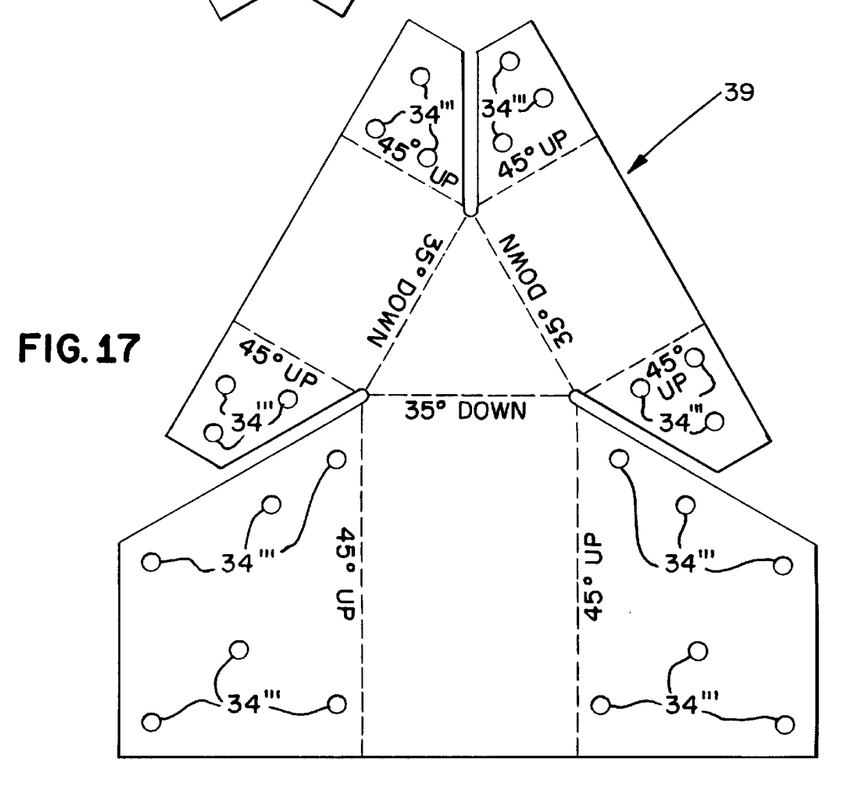
FIG. 17 is a plan view of a blank that can be bent to form the tie of FIG. 14.

FIGS. 14 and 15 show an alternate embodiment of the connection made according to the present invention using a one-piece rigid tie 10''' having first, second and third gussets 13''', 16''' and 26''' that are also rectangular. The blank 39 for this alternate embodiment differs from blank 38 to better accommodate a connection where two of the three structural members that are joined are much larger than the other structural member. The blank 38 is bent at the dotted bend lines and at the specified angles shown in FIG. 17 to form a one-piece rigid tie connection 10'''. Alternate embodiment 10''' is formed with the same elements and works in a similar fashion as the preferred embodiment; thus further description is not necessary. Like elements are identified with like numbers followed by a triple prime.

I claim:
1. A rigid intersection connection in a structure comprising:
   a. an elongated longitudinal member having first and second sides;
   b. a first elongated lateral member having a first base side, a first flank side, and a first end, said first elongated lateral member intersecting with said elongated longitudinal member such that said first end of said first elongated lateral member forms a first joint with said first side of said elongated longitudinal member;
   c. a second elongated lateral member having a second base side, a second flank side, and a second end, said second elongated lateral member intersecting with said elongated longitudinal member at approximately the same elevation on said elongated longitudinal member as said first joint and such that said second end of said second elongated lateral member forms a second joint with said second side of said elongated longitudinal member;
   d. a one-piece rigid tie configured for rigidly tying said first and second elongated lateral members to said elongated longitudinal member including,
      1. a first side attachment tab disposed in registration with a portion of said first side of said elongated longitudinal member,
      2. a first base side attachment tab disposed in registration with a portion of said first base side of said first elongated lateral member,
      3. a first gusset formed integral with and between said first side attachment tab and said first base side attachment tab, said first gusset lying in a different plane from either said first side attachment tab or said first base side attachment tab,
      4. a second side attachment tab disposed in registration with a portion of said second side of said elongated longitudinal member,
      5. a second base side attachment tab disposed in registration with a portion of said second base side of said second elongated lateral member,
      6. a second gusset formed integral with and between said second side attachment tab and said second base side attachment tab, said second gusset lying in a different plane from either said second side attachment tab or said second base side attachment tab,
      7. a first flank side attachment tab disposed in registration with a portion of said first flank side of said first elongated lateral member,
      8. a second flank side attachment tab disposed in registration with a portion of said second flank side of said second elongated lateral member,
      9. a third gusset formed integral with and between said first flank side attachment tab and said second flank side attachment tab, said third gusset lying in a different plane from either said first flank side attachment tab or said second flank side attachment tab,
      10. a web member connecting said first gusset, said second gusset, and said third gusset;
   e. first fastener means for attaching said first side attachment tab to said first side of said elongated longitudinal member;
   f. second fastener means for attaching said first base side attachment tab to said first base side of said first elongated lateral member;
   g. third fastener means for attaching said second side attachment tab to said second side of said elongated longitudinal member;

h. fourth fastener means for attaching said second base side attachment tab to said second base side of said second elongated lateral member;

i. fifth fastener means for attaching said first flank side attachment tab to said first flank side of said first elongated lateral member; and j. sixth fastener means for attaching said second flank side attachment tab to said second flank side of said second elongated lateral member.

2. The connection of claim 1, wherein:

said web member is triangular in shape.

3. The connection of claim 2, wherein:

said web member is integrally connected to said fist, second and third gussets.

4. The connection of claim 3, wherein:

said first, second and third gussets are triangular in shape.

5. The connection of claim 1, wherein:

said web member is integrally connected to said fist, second and third gussets.

6. The connection of claim 1, wherein:

said first, second and third gussets are triangular in shape.

7. The connection of claim 1, wherein:

said first, second and third gussets are rectangular in shape.

8. The connection of claim 1, wherein:

said first, second and third gussets are substantially planar members.

9. A rigid intersection connection in a structure comprising:

a. an elongated longitudinal member having first and second sides, said first and second sides being disposed in relation to each other such that said first and second sides define a reflex angle that is bounded by said first side, sweeps away from said elongated longitudinal member through a one-piece rigid tie attached to said longitudinal member and is bounded by said second side;

b. a first elongated lateral member having a first base side, a first flank side, and a first end, said first elongated lateral member intersecting with said elongated longitudinal member such that said first end of said first elongated lateral member forms a first joint with said first side of said elongated longitudinal member;

c. a second elongated lateral member having a second base side, a second flank side, and a second end, said second elongated lateral member intersecting with said elongated longitudinal member at approximately the same elevation on said elongated longitudinal member as said first joint and such that said second end of said second elongated lateral member forms a second joint with said second side of said elongated longitudinal member;

d. said one-piece rigid tie configured for rigidly tying said first and second elongated lateral members to said elongated longitudinal member including, 1. a first side attachment tab disposed in registration with a portion of said first side of said elongated longitudinal member, 2. a first base side attachment tab disposed in registration with a portion of said first base side of said first elongated lateral member, 3. a first gusset formed integral with and between said first side attachment tab and said first base side attachment tab, 4. a second side attachment tab disposed in registration with a portion of said second side of said elongated longitudinal member, 5. a second base side attachment tab disposed in registration with a portion of said second base side of said second elongated lateral member, 6. a second gusset formed integral with and between said second side attachment tab and said second base side attachment tab, 7. a first flank side attachment tab disposed in registration with a portion of said first flank side of said first elongated lateral member, 8. a second flank side attachment tab disposed in registration with a portion of said second flank side of said second elongated lateral member, 9. a third gusset formed integral with and between said first flank side attachment tab and said second flank side attachment tab, 10. a web member connecting said first gusset, said second gusset, and said third gusset;

e. first fastener means for attaching said first side attachment tab to said first side of said elongated longitudinal member;

f. second fastener means for attaching said first base side attachment tab to said first base side of said first elongated lateral member;

g. third fastener means for attaching said second side attachment tab to said second side of said elongated longitudinal member;

h. fourth fastener means for attaching said second base side attachment tab to said second base side of said second elongated lateral member;

i. fifth fastener means for attaching said first flank side attachment tab to said first flank side of said first elongated lateral member; and j. sixth fastener means for attaching said second flank side attachment tab to said second flank side of said second elongated lateral member.

10. A web member connecting said first gusset, said second gusset, and said third gusset;

e. first fastener means for attaching said first side attachment tab to said first side of said elongated longitudinal member;

f. second fastener means for attaching said first base side attachment tab to said first base side of said first elongated lateral member;

g. third fastener means for attaching said second side attachment tab to said second side of said elongated longitudinal member;

h. fourth fastener means for attaching said second base side attachment tab to said second base side of said second elongated lateral member;

i. fifth fastener means for attaching said first flank side attachment tab to said first flank side of said first elongated lateral member; and j. sixth fastener means for attaching said second flank side attachment tab to said second flank side of said second elongated lateral member.

11. The connection of claim 9, wherein:

said first, second and third gussets are substantially planar members.

12. A rigid intersection connection in a structure comprising:

a. an elongated longitudinal member having first and second side faces;

b. a first elongated lateral member having a first base side, a first flank side, and a first end, said first elongated lateral member intersecting with said elongated longitudinal member such that said first end of said first elongated lateral member forms a first joint and registers with said first side face of said elongated longitudinal member;

c. a second elongated lateral member having a second base side, a second flank side, and a second end, said second elongated lateral member intersecting with said elongated longitudinal member at approximately the same elevation on said elongated longitudinal member as said first joint and such that said second end of said second elongated lateral member forms a second joint and registers with said second side face of said elongated longitudinal member;

d. a one-piece rigid tie configured for rigidly tying said first and second elongated lateral members to said elongated longitudinal member including,
  1. a first side attachment tab disposed in registration with a portion of said first side face of said elongated longitudinal member, such that said first side attachment tab aligns with said first end of said first elongated lateral member,
  2. a first base side attachment tab disposed in registration with a portion of said first base side of said first elongated lateral member,
  3. a first gusset formed integral with and between said first side attachment tab and said first base side attachment tab,
  4. a second side attachment tab disposed in registration with a portion of said second side face of said elongated longitudinal member, such that said second side attachment tab aligns with said second end of said second elongated lateral member,
  5. a second base side attachment tab disposed in registration with a portion of said second base side of said second elongated lateral member,
  6. a second gusset formed integral with and between said second side attachment tab and said second base side attachment tab,
  7. a first flank side attachment tab disposed in registration with a portion of said first flank side of said first elongated lateral member,
  8. a second flank side attachment tab disposed in registration with a portion of said second flank side of said second elongated lateral member,
  9. a third gusset formed integral with and between said first flank side attachment tab and said second flank side attachment tab,
  10. a web member connecting said first gusset, said second gusset, and said third gusset;

e. first fastener means for attaching said first side attachment tab to said first side face of said elongated longitudinal member;

f. second fastener means for attaching said first base side attachment tab to said first base side of said first elongated lateral member;

g. third fastener means for attaching said second side attachment tab to said second side face of said elongated longitudinal member;

h. fourth fastener means for attaching said second base side attachment tab to said second base side of said second elongated lateral member;

i. fifth fastener means for attaching said first flank side attachment tab to said first flank side of said first elongated lateral member; and j. sixth fastener means for attaching said second flank side attachment tab to said second flank side of said second elongated lateral member.

13. A rigid intersection connection in a structure comprising:

a. an elongated longitudinal member having first and second sides;

b. a first elongated lateral member having a first base side, a first flank side, and a first end, said first elongated lateral member intersecting with said elongated longitudinal member such that said first end of said first elongated lateral member forms a first joint with said first side of said elongated longitudinal member;

c. a second elongated lateral member having a second base side, a second flank side, and a second end, said second elongated lateral member intersecting with said elongated longitudinal member at approximately the same elevation on said elongated longitudinal member as said first joint and such that said second end of said second elongated lateral member forms a second joint with said second side of said elongated longitudinal member;

d. a one-piece rigid tie configured for rigidly tying said first and second elongated lateral members to said elongated longitudinal member including,
  1. a first side attachment tab disposed in registration with a portion of said first side of said elongated longitudinal member,
  2. a first base side attachment tab disposed in registration with a portion of said first base side of said first elongated lateral member,
  3. a first triangular gusset formed integral with and between said first side attachment tab and said first base side attachment tab,
  4. a second side attachment tab disposed in registration with a portion of said second side of said elongated longitudinal member,
  5. a second base side attachment tab disposed in registration with a portion of said second base side of said second elongated lateral member,
  6. a second triangular gusset formed integral with and between said second side attachment tab and said second base side attachment tab,
  7. a first flank side attachment tab disposed in registration with a portion of said first flank side of said first elongated lateral member,
  8. a second flank side attachment tab disposed in registration with a portion of said second flank side of said second elongated lateral member,
  9. a third triangular gusset formed integral with and between said first flank side attachment tab and said second flank side attachment tab,
  10. a web member connecting said first gusset, said second gusset, and said third gusset;

e. first fastener means for attaching said first side attachment tab to said first side of said elongated longitudinal member;

f. second fastener means for attaching said first base side attachment tab to said first base side of said first elongated lateral member;

g. third fastener means for attaching said second side attachment tab to said second side of said elongated longitudinal member;

h. fourth fastener means for attaching said second base side attachment tab to said second base side of said second elongated lateral member;

i. fifth fastener means for attaching said first flank side attachment tab to said first flank side of said first elongated lateral member; and j. sixth fastener means for attaching said second flank side attachment tab to said second flank side of said second elongated lateral member.

14. A rigid intersection connection in a structure comprising:
   a. an elongated longitudinal member having first and second sides;
   b. a first elongated lateral member having a first base side, a first flank side, and a first end, said first elongated lateral member intersecting with said elongated longitudinal member such that said first end of said first elongated lateral member forms a first joint with said first side of said elongated longitudinal member;
   c. a second elongated lateral member having a second base side, a second flank side, and a second end, said second elongated lateral member intersecting with said elongated longitudinal member at approximately the same elevation on said elongated longitudinal member as said first joint and such that said second end of said second elongated lateral member forms a second joint with said second side of said elongated longitudinal member;
   d. a one-piece rigid tie configured for rigidly tying said first and second elongated lateral members to said elongated longitudinal member including,
      1. a first side attachment tab disposed in registration with a portion of said first side of said elongated longitudinal member,
      2. a first base side attachment tab disposed in registration with a portion of said first base side of said first elongated lateral member,
      3. a first rectangular gusset formed integral with and between said first side attachment tab and said first base side attachment tab,
      4. a second side attachment tab disposed in registration with a portion of said second side of said elongated longitudinal member,
      5. a second base side attachment tab disposed in registration with a portion of said second base side of said second elongated lateral member,
      6. a second rectangular gusset formed integral with and between said second side attachment tab and said second base side attachment tab,
      7. a first flank side attachment tab disposed in registration with a portion of said first flank side of said first elongated lateral member,
      8. a second flank side attachment tab disposed in registration with a portion of said second flank side of said second elongated lateral member,
      9. a third rectangular gusset formed integral with and between said first flank side attachment tab and said second flank side attachment tab,
      10. a web member connecting said first gusset, said second gusset, and said third gusset;
   e. first fastener means for attaching said first side attachment tab to said first side of said elongated longitudinal member;
   f. second fastener means for attaching said first base side attachment tab to said first base side of said first elongated lateral member;
   g. third fastener means for attaching said second side attachment tab to said second side of said elongated longitudinal member;
   h. fourth fastener means for attaching said second base side attachment tab to said second base side of said second elongated lateral member;
   i. fifth fastener means for attaching said first flank side attachment tab to said first flank side of said first elongated lateral member; and
   j. sixth fastener means for attaching said second flank side attachment tab to said second flank side of said second elongated lateral member.

* * * * *

UNITED STATES PATENT AND TRADEMARK OFFICE
CERTIFICATE OF CORRECTION

PATENT NO.   : 6,022,165
DATED        : February 8, 2000
INVENTOR(S)  : Jin-Jie Lin It is certified that error appears in the above-identified patent and that said Letters Patent is hereby corrected as shown below:

Column 7,
Line 13, replace "fist" with -- first --.
Line 18, replace "fist" with -- first --.

Column 8,
Lines 36 through 55, replace "10. A web member connecting said first gusset, said second gusset, and said third gusset;
e. first fastener means for attaching said first side attachment tab to said first side of said elongated longitudinal member;
f. second fastener means for attaching said first base side attachment tab to said first base side of said first elongated lateral member;
g. third fastener means for attaching said second side attachment tab to said second side of said elongated longitudinal member;
h. fourth fastener means for attaching said second base side attachment tab to said second base side of said second elongated lateral member;
i. fifth fastener means for attaching said first flank side attachment tab to said first flank side of said first elongated lateral member; and
j. sixth fastener means for attaching said second flank side attachment tab to said second flank side of said second elongated lateral member."

UNITED STATES PATENT AND TRADEMARK OFFICE
CERTIFICATE OF CORRECTION

PATENT NO. : 6,022,165
DATED : February 8, 2000
INVENTOR(S) : Jin-Jie Lin

It is certified that error appears in the above-identified patent and that said Letters Patent is hereby corrected as shown below:

with -- 10. The connection of claim 9, wherein:
 a. said first gusset lies in a different plane from either said first side attachment tab or said first base side attachment tab,
b. said second gusset lies in a different plane from either said second side attachment tab or said second base side attachment tab, and
c. said third gusset lies in a different plane from either said first flank side attachment tab or said second flank side attachment tab. --

Signed and Sealed this

Twenty-second Day of January, 2002

*Attest:*

JAMES E. ROGAN
*Attesting Officer*     *Director of the United States Patent and Trademark Office*